July 2, 1957 C. E. FISK 2,797,500
EDUCATIONAL DEVICES
Filed June 15, 1955 5 Sheets-Sheet 4
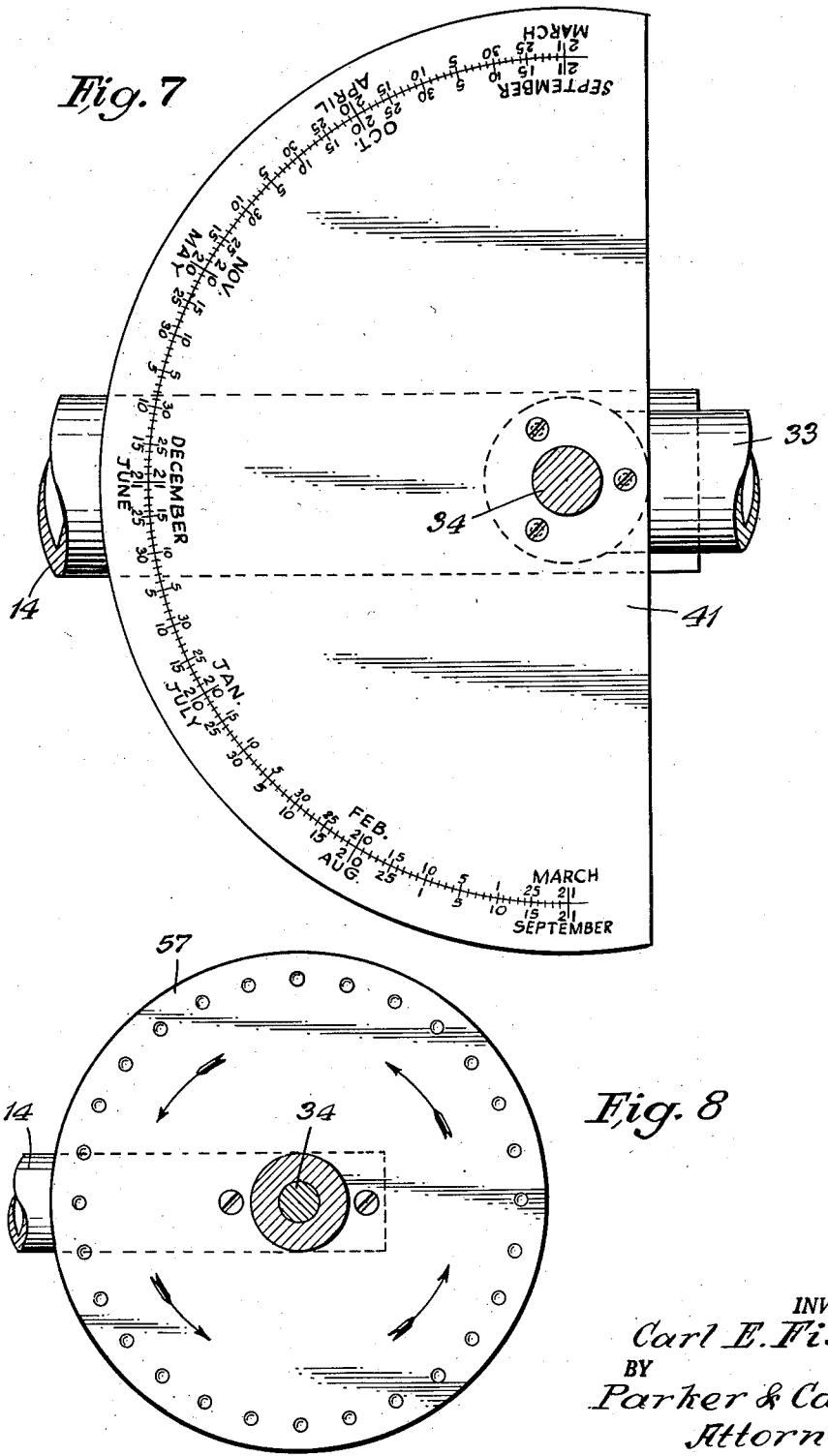
INVENTOR.
Carl E. Fisk
BY
Parker & Carter
Attorneys July 2, 1957
C. E. FISK
2,797,500
EDUCATIONAL DEVICES
Filed June 15, 1955
5 Sheets-Sheet 5
*Fig. 9*
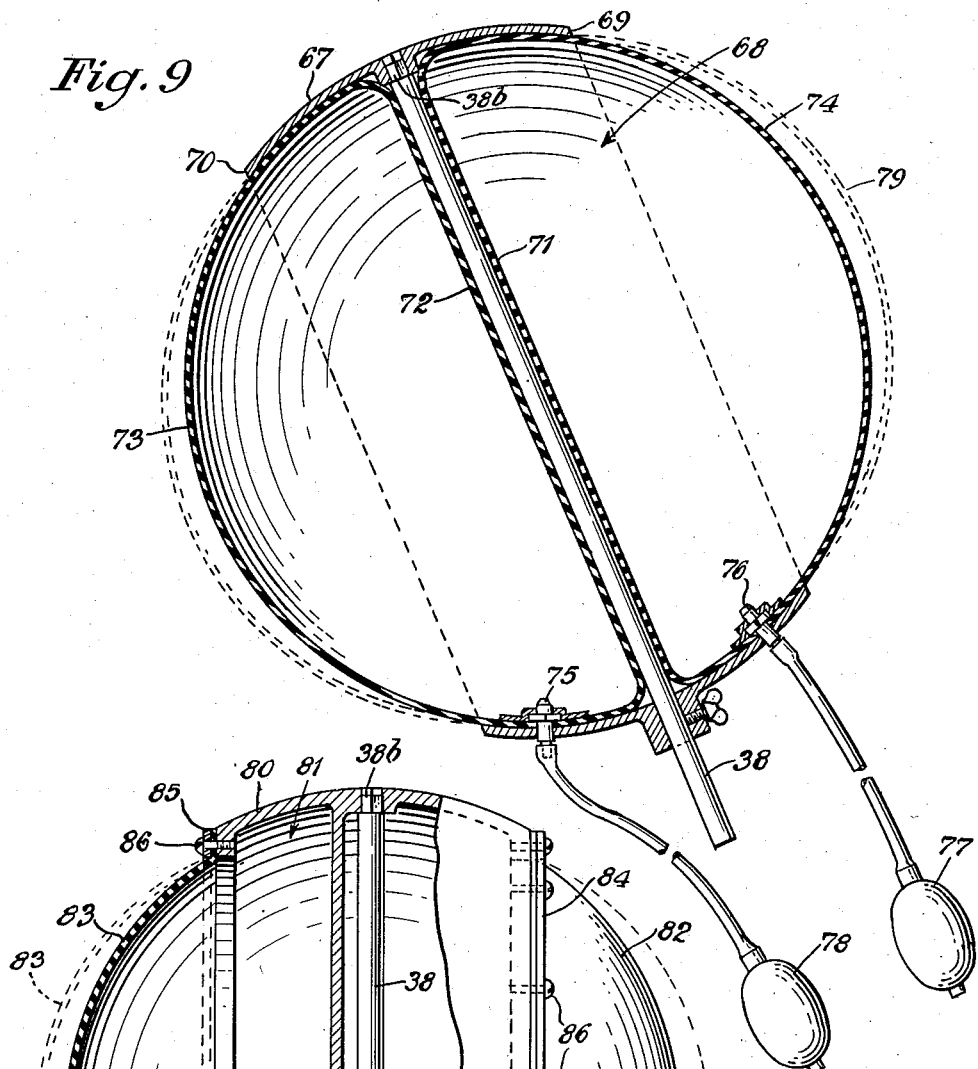
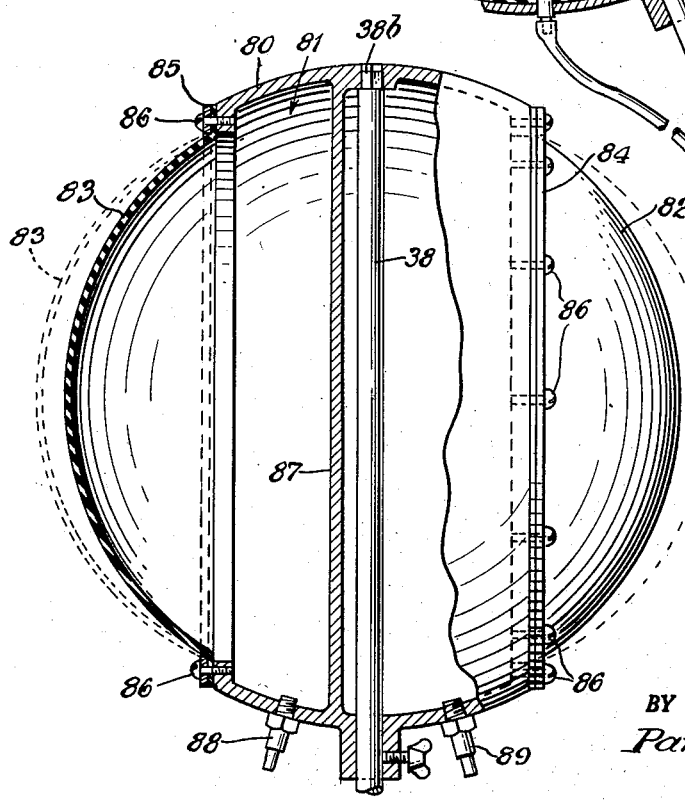
*Fig. 10*
INVENTOR.
*Carl E. Fisk*
BY
*Parker & Carter*
*Attorneys*

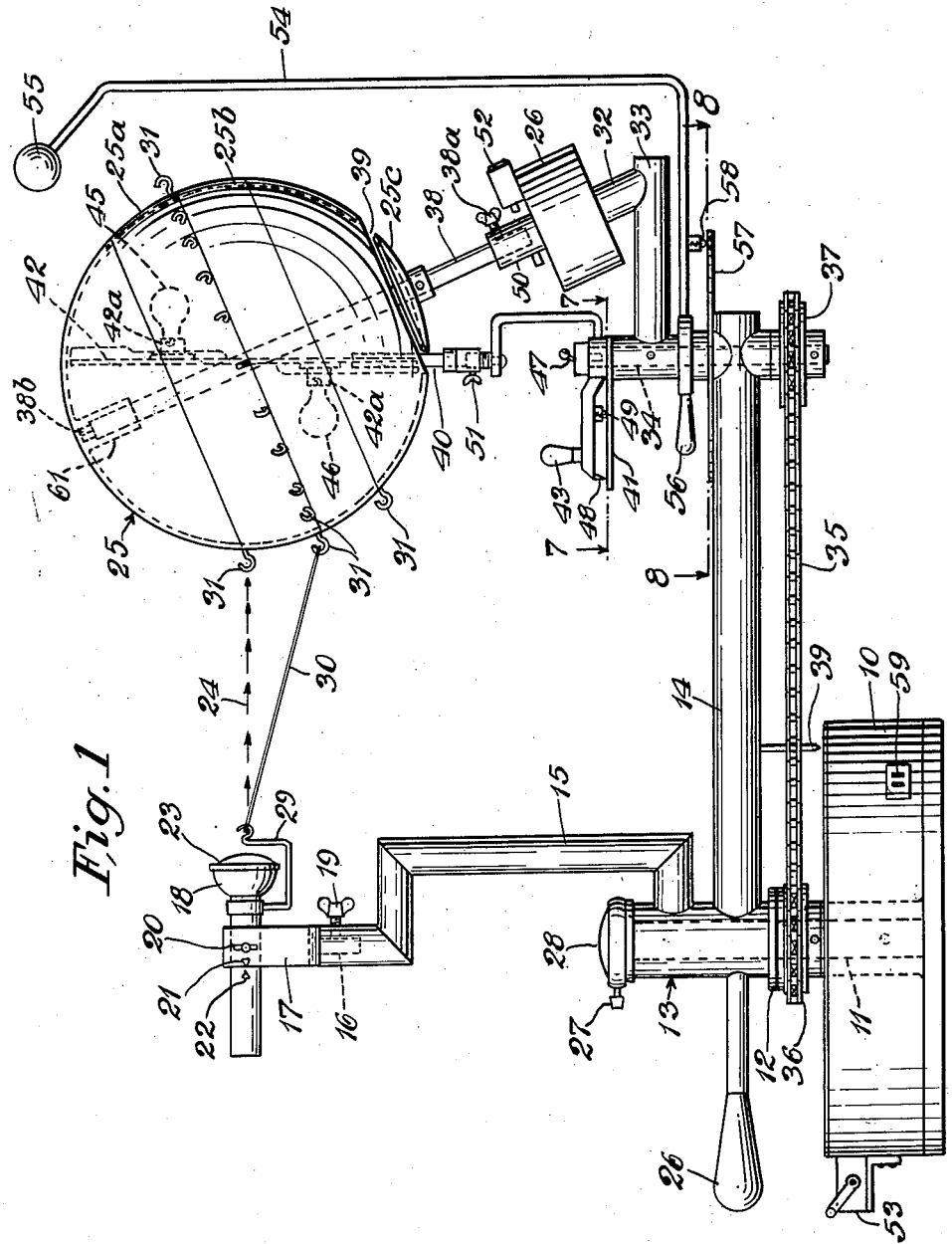

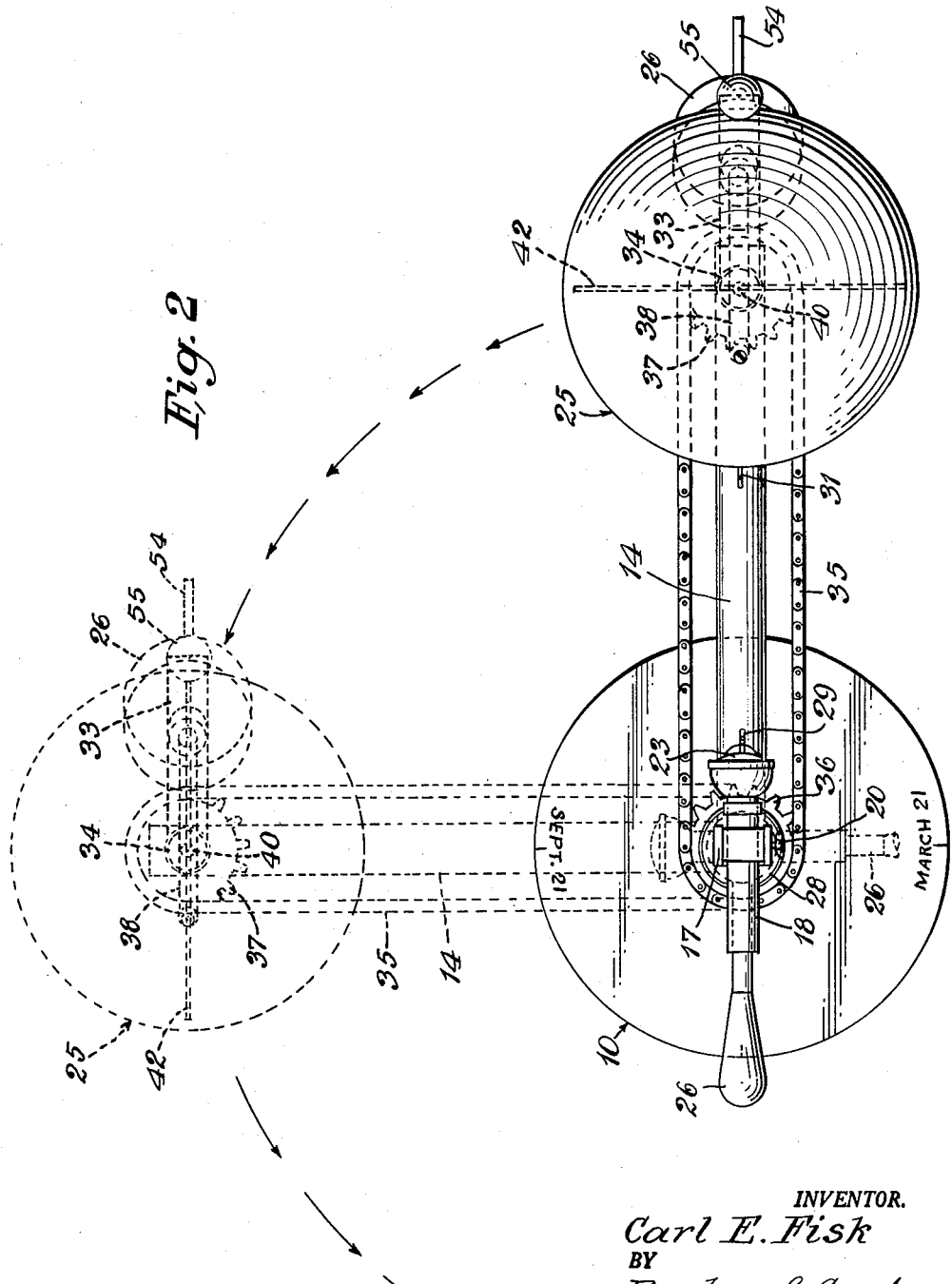

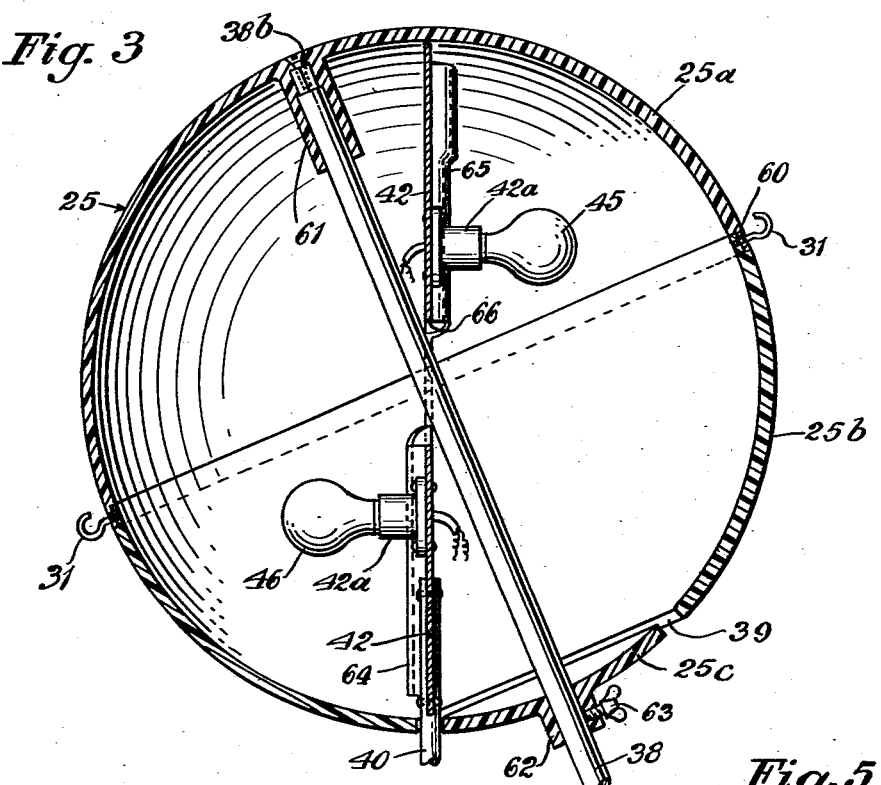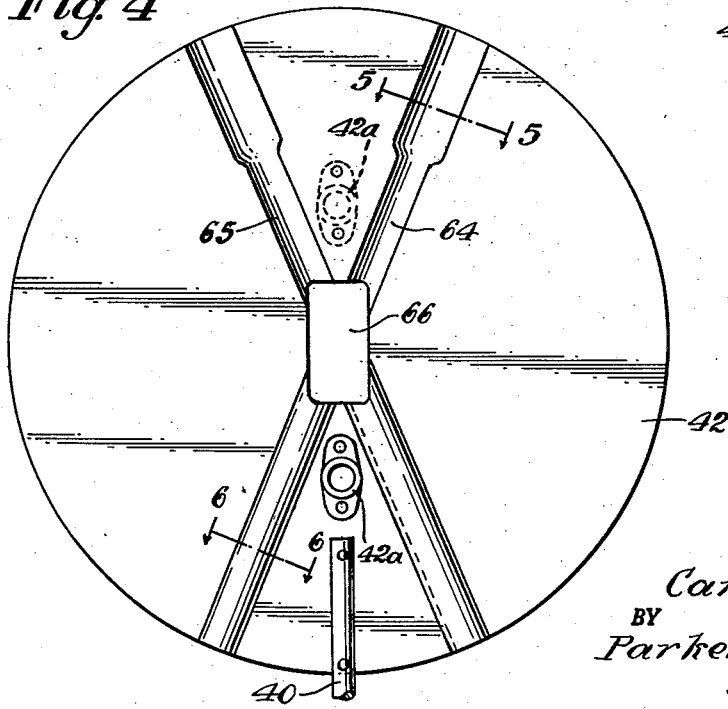

United States Patent Office 2,797,500
Patented July 2, 1957

2,797,500

EDUCATIONAL DEVICES

Carl E. Fisk, Maywood, Ill.

Application June 15, 1955, Serial No. 515,631

2 Claims. (Cl. 35—45)

The principal object of the invention, which might be described as a new type of planetarium, is to provide means for teaching, demonstrating and solving specific problems relative to the earth's daily rotation on its axis and the earth's yearly orbit about the sun. The moon's orbit about the earth and the phases of the moon and tides can also be demonstrated with the device.

The accompanying drawings illustrate various views and features of the device and the preferred plan of construction.

Figure 1 is a side elevation of my invention;

Figure 2 is a top plan view of Figure 1;

Figure 3 is a vertical section of the globe illustrated in Figure 1 on an enlarged scale;

Figure 4 is a plan view of an internal plate usable with the globe;

Figure 5 is a section taken on line 5—5 of Figure 4;

Figure 6 is a section taken on line 6—6 of Figure 4;

Figure 7 is a section on an enlarged scale taken on line 7—7 of Figure 1;

Figure 8 is a section on an enlarged scale taken on line 8—8 of Figure 1;

Figure 9 is a vertical section of a variant form of the globe employed with my invention;

Figure 10 is a side elevation with parts broken away and parts in section of another variant form of the globe employed with my invention.

Similar numerals designate similar parts throughout the several views. For a full understanding of the invention, reference may be had to the following specification with detailed references to each drawing.

Referring to Figure 1, 10 designates a base of any suitable material. Vertical member 11 is stationary and is fastened to base 10. Rotatably mounted on member 11 and resting on a ball-bearing structure 12 is sleeve 13 with attached horizontal bar 14. An irregularly bent hollow support 15 extends outwardly and upwardly from sleeve 13 with which it rotates. Removably fitted into the upper end of support 15 is a pin 16. A forked member 17 is integral with and extends upwardly from pin 16 to form, in effect, an extension of support 15. A light source 18, with appropriate electrical or other means of illumination, is supported by member 17. A locking screw 19 locks forked member 17 to support 15. By releasing lock screw 19, forked member 17 may be rotated in a horizontal plane relative to base 10 and support 15. A locking screw 20 removably secures light 18 to forked member 17. By releasing lock screw 20, light 18 may be tipped up or down through an arc of several degrees. Notch 21 in forked member 17 and notch 22 in light 18, when aligned with each other, indicate light 18 is on the level. Light 18 has a focusing lens 23 so that a light beam 24, emanating from light source 18, can be either diffused or focused sharply on a globe 25. Horizontal bar 14, sleeve 13, and attached support 15 may be rotated on ball-bearing structure 12 by the use of handle 26, which is connected to the opposite side of sleeve 13 and weighted to counter-balance globe 25.

Attached to and in axial alignment with light 18 is a hook 29 to which elastic band 30 can be attached and stretched to fasten to a hook or hooks 31 on globe 25. The hooks 31 individually simulate a man standing upon globe 25 and the elastic band 30, his line of vision to the sun represented by light 18, thus indicating the direction a person standing at the location of any of the hooks 31 upon globe 25 would look to see the sun 18, whether to the north, the south, or directly overhead.

Globe 25, representing the earth, is mounted on and about an axis shaft 38 for rotation therewith. Shaft 38 is mounted on turntable 33 at a 23½ degree angle from the vertical. Turntable 33 is mounted for rotation with an upright pivot shaft 34 which rises from and turns in bar 14 adjacent the outer end thereof. Globe 25 is so mounted that its center is directly above pivot 34. Chain drive 35 is engaged with sprocket 36, which is fixed on the stationary vertical member 11 and turns sprocket 37, which is attached to pivot 34 and turntable 33, as bar 14 is rotated about its vertical axis 11. One complete rotation of bar 14 through 360 degrees will cause one complete 360-degree rotation of turntable 33 about the end of arm 14 since sprocket wheels 36 and 37 are the same diameter. Thus the polar tip of globe 25 will always be maintained in the same direction as shown in Figure 1, which, in the case of the real earth, is to the northward.

Globe 25 is rotated with shaft 38 by driving means, such as an electric motor 26 which is mounted on fixed shaft 32 and connected to shaft 38 through stub shaft 50 and lock screw 38a. Switch 27 controls motor 26 to rotate globe 25 and also actuates stop watch 28, mounted on shaft 11, so that the rotation of globe 25 can be accurately timed. Watch 28 has twenty-four subdivisions on its face representing the twenty-four hours of the day, each hour equaling a few seconds. Globe 25 may be set to turn 360 degrees on shaft 38, the period required for the hand on watch 28 to traverse its face through one complete rotation. This accuracy of timing the rotation of globe 25 is important for certain demonstrations. Base 10 has the 365 days of the year delineated upon its top surface and pointer 39, depending from arm 14 adjacent and above the outer peripheral area of said top surface, indicates the movement of arm 14 from day to day in the orbit of globe 25. Thus the orbit and rotation of globe 25 may be exercised independently of each other or synchronized in almost any fashion one might wish by controlling the speed of movement of handle 26.

Globe 25 may be constructed of three sections, which may be made of any suitable translucent material. The half 25a of globe 25, representing that hemisphere of the earth north of the Equator, is secured to the opposite half-section 25b, representing that hemisphere south of the Equator, by means of a flange construction 60. A series of outwardly extending hooks 31, spaced each 15 degrees around the "Equator," have their threaded inner ends in engagement with the flanges on globe sections 25a, 25b to secure them together. These two sections, 25a and 25b, are secured to shaft 38 at the point of the "North Pole" on globe 25 by bearing member 61. Bearing member 61 is provided with squared socket adapted to receive the squared outer end 38b of shaft 38. The smaller section 25c of the globe 25, representing the earth below the Antarctic Circle, is spaced from section 25b at the latitude of the Antarctic Circle and is secured through sleeve 62 and screw 63 to shaft 38 at its center, representing the point of the South Pole. The spacing of section 25c from section 25b creates annular slot 39. Extending vertically through slot 39 is vertical upright support 40 attached to base and dial 41 mounted on pivot 34. Support 40 extends upright to a point just short of shaft 38. Attached to support 40 within globe 25 is a vertical circular plate 42 of a material impervious to light with a diameter slightly less than the inside of globe 25 so that plate 42 can be rotated freely relative to and inside globe 25. The upper edge of plate 42 is positioned at the latitude of the Arctic Circle and the lower edge of plate 42 is positioned at the latitude of the Antarctic Circle when the device is in the position shown in Figure 1. Plate 42 has a large opening 66 at its center through which passes shaft 38. Plate 42 can be turned by handle 43 approximately 180 degrees to the right and to the left, plate 42 being so crimped as at 64, 65 that when it is turned so as to lie in a plane occupied by shaft 38, representing the polar axis of globe 25, it will form or fold itself about shaft 38, and thus form a bisecting line of globe 25 nearly parallel with the "North and South Poles." On each side of plate 42 within globe 25 are mounted light sockets 42a and lights 45 and 46, controlled by a two-way electric switch 47 so that either light may be illuminated independently of the other.

Dial 41, with various dates of the year imprinted in an arc on its face, as shown in Figure 7, is used to determine the proper setting of plate 42 so as to correspond with the date on base 10 at which pointer 39 indicates globe 25 is located at any period in its orbit. When the date indicated on dial 41 by pointer 48 mounted on handle 43 is the same as the date indicated on base 10 by pointer 39, the plate 42 inside globe 25 is standing at a right angle to light 18, so that by the proper setting of pointer 48 and the illuminating of either light 45 or 46, whichever of them may be facing light 18 at any particular setting of pointer 48, one can illustrate that half of globe 25 that is illuminated by light 18 any point in the orbit of globe 25. Thus in Figure 1, pointer 48 and pointer 39 would each be set at the June 21 date. Handle 43 is used to move plate 42 and pointer 48 to the proper date. Friction element 49 on handle 43 prevents slippage and unintended movement of plate 42.

Lock screw 38a releases globe 25 from motor-driven stub shaft 50 so that globe 25 may be turned freely by hand or so other types of globes can be mounted on shaft 50. Lock screw 51 releases upright support 40 from handle 43 so that globe 25 may be released from shaft 50 for the same purposes.

Automatic counter 52 on motor 26 records the number of rotations globe 25 makes in any particular demonstration. Hand-operated counter 53, mounted on base 10, may also be used in counting the rotations of globe 25.

Upright member 54, which supports the smaller globe 55, representing the moon, is secured loosely about pivot 34 and can be revolved about globe 25 by the rotation of handle 56 about pivot 34. A circular dial 57 fastened securely to bar 14 about the axis of pivot 34 has 28 equally spaced notches about its periphery representing the twenty-eight days it requires the moon to make one revolution about the earth. As member 54 is moved by handle 56 spring friction member 58 on member 54 engages these notches so that globe 55 can be set in the desired position with respect to globe 25 and light 18 at any period of the month by consulting any calendar.

Electric plug-in 59 in base 10 is a means by which electricity may be supplied to light 18, motor 26, and lights 45 and 46.

Figure 2 is a top plan view of the device. It shows in full lines the position of the elements of the device as it was in Figure 1 and shows, in dotted lines, the position of the elements after globe 25 and bar 14 have been revolved one-fourth of the way (counterclockwise) in the orbit about pivot axis 11 from the position shown in Figure 1. In the dotted line position turntable 33 is seen to have been turned by chain drive 35 so that it rests at a right angle to bar 14, the polar tip of globe 25 remaining oriented in the same direction as it was in Figure 1. Handle 26, in revolving bar 14 and globe 25, also turns light 18 so that it is constantly directed at globe 25. Since the purpose of plate 42 is to show that half of globe 25 that is illuminated by light 18 at any period in the orbit of globe 25, plate 42 will be turned manually by handle 43 so that plate 42 lies at right angles to light 18 and thus plate 42 is bisecting the "polar axis" of globe 25.

Figure 8 illustrates circular dial 57 which is securely anchored to bar 14 and which has 28 small depressions or notches about its circumference used to control the proper setting of globe 55 which represents the moon. The arrows indicated the direction in which handle 56 is moved so that spring friction member 58 may engage each of the 28 notches which represent the twenty-eight days it requires the "moon" 55 to make one revolution about globe 25. Since the moon's actual orbit is slightly more than twenty-eight days in length, an occasional adjustment in moving globe 55 in its orbit may be necessary; this, of course, can be controlled by checking any calendar which shows the periods or phases of the moon.

Figure 9 illustrates a variant form of the globe 25. 67 is a ring, the wall of which is concave-convex and is apertured to receive the shaft 38. Ring 67 is, in effect, a partial or skeleton globe of the earth, the outer surface 68 of which may or may not contain a rough outline of the major land masses of the Eastern and Western Hemispheres. The two edges 69, 70 of ring 67 serve to guide inflated bladders or balloons 73 and 74, which, when inflated, complete a globe, with ring 67, the balloons occupying the approximate areas of and representing the Atlantic and Pacific Oceans on the earth. Balloons 73 and 74 are molded so as to be form fitting, their heavy bases 71 and 72 lying against shaft 38 which supports the ring 67. Balloons 73 and 74 are attached to valves 75 and 76 in ring 67 and may be inflated by any suitable means such as bulbs 77 and 78.

Figure 10 is a side elevation with parts broken away and parts in section of a further variation of globe 25. 80 is a ring having a concave-convex wall and may be considered a partial or skeleton globe of the earth, the outer surface 81 of which may or may not contain a rough outline of the major land masses of the Eastern and Western Hemispheres. The two edges of ring 80 are equipped to be fitted with elastic diaphragms or membranes 82 and 83, each of these membranes having circular frames or rings 84 and 85 which exactly fit the opposite edges of ring 80. Frames 84 and 85 are firmly attached to ring 80 by screws 86. A solid partition wall 87 divides ring 80 into two airtight compartments. By the use of valves 88 and 89 in the circumferential wall of ring 80 on opposite sides of partition 87, each of these elastic membranes 82 and 83 may be inflated in a manner similar to that in which balloons 73 and 74, illustrated in Figure 9, were inflated, thus causing a bulge in the contour of the globe of Figure 10, as shown by dotted line 83.

It will be realized that, whereas I have described and illustrated a practical and operative device, nevertheless, many changes may be made in the size, shape, number, and disposition of parts without departing from the spirit of my invention. I therefore wish my description and drawings to be taken as, in a broad sense, illustrative or diagrammatic, rather than as limiting me to my precise showing.

The use and operation of my invention are as follows:

I provide a teaching device which is, in effect, a simplified planetarium. The light 18 represents the sun. The globe 25 represents the earth, the axis of which is represented by the shaft 38 with which the globe 25 rotates. The smaller globe 55 represents the moon and is rotatable about a pivot positioned beneath and along a center line of the globe 25. The globe 25 is carried at the outer end of an arm 14, which is rotatable about a pivot 11 to represent the orbit of the earth around the sun. The globe 25 and the axis 38 are in turn relatively rotatable in relation to the outer end of the arm 14 in order to retain the globe 25 in the proper position as it traverses its orbit about the sun represented by the light 18. A light-impervious divider is positioned within the hollow globe 25 and carries on opposite sides thereof light sources 45, 46 in order to illuminate an appropriate portion of the globe 25 when it is formed of translucent material as a part of the teaching process. Individual hooks 31 are positionable at a variety of points on the globe 25 and may be connected by suitable elastic means 30 with a hook 29 positioned in front of and in actual alignment with the light source 18 in order to simulate the line of vision of a person on the earth represented by the globe 25 in looking toward the sun represented by the light 18.

For convenience herein, the light 18 may also be termed the sun 18. Similarly, the globe 25 may be called the earth 25, the globe 55 may be called the moon 55, the shaft 38 may be considered the earth-axis 38, the rotation of the globe 25 on its shaft 38 may be considered the rotation of the earth on its axis, and the rotation of the globe 25 with arm 14 about the pivot 11 may be considered the orbit of the earth about the sun 18, and the light beam 24 may be considered sun rays 24.

Referring to Figure 1, it will be seen that the sun rays 24 are focused sharply upon the earth 25, illustrating that point or area on the earth upon which the sun rays 24 shine vertically at a given date in the year. The circumferential line running about the earth 25 at the point of the uppermost hook 31, shown in Figure 1, represents the Tropic of Cancer, the central row of hooks 31 and the line alongside them represents the Equator, and the lowermost line girding the earth at the lowermost hooks 31 in Figure 1 represents the Tropic of Capricorn. As handle 26 is moved and the bar 14 is rotated about the pivot 11, the chain 35 is effective to maintain the earth 25 in the same position relative to two directions as that illustrated in Figure 1. This feature is brought out in dotted lines in Figure 2. Thus, as the earth follows its orbit about the sun 18, the sun rays 24 will be seen to move between the Tropic of Cancer and the Tropic of Capricorn as the days of the year, set out on the base 10, pass by during the orbit of the earth 25 about the sun 18.

Thus, since the earth 25 is maintained at its 23½ degree tilt on its axis 38, and since this angle from the vertical is constantly maintained as the earth 25 moves in its orbit about the sun 18, the vertical sun rays 24 are seen to move 23½ degrees north and south of the Equator during one revolution of bar 14, representing one full year of time. The sun rays 24 can be moved through means 20, 21, 22 so as to be directed toward either the North or South Pole of the earth 25, and it may definitely be demonstrated how the sun rays 24 will extend beyond the North Pole of the earth 25 and fall short of the South Pole when the earth 25 is in a position shown in Figure 1. While the distances and angles involved herein between the light 18 and globe 25 may not be absolutely and precisely those which actually exist between the earth and the sun, it will be seen that such factors are close enough and fully effective to illustrate actuality.

Since fork 17 can be released from support 15 through lock screw 19, the sun 18 can be moved horizontally and thus the sun rays 24 may be made to fall at any point upon the earth 25 from the point of center as to the point of sunset as the earth 25 is rotated on its axis 38 from west to east. In this manner, a fairly accurate length of the daylight period for any latitude upon the surface of the earth 25 may be determined.

The hooks 31, elastic means 30, and hook 29 enable demonstration of the direction in which a person standing at the location of any of the hooks 31 upon the earth 25 would have to look to see the sun 18. Thus, in Figure 1, a man standing at hook 31 on the Equator to which the elastic means 30 is attached must look to the north to see the sun 18 since the sun rays 24 are directly over the Tropic of Cancer which is 23¼ degrees north of the equator and is represented by the uppermost hook 31, shown in Figure 1. A man standing at the uppermost hook 31, that is, at the Tropic of Cancer, would have the sun rays 24 directly overhead, as shown by the arrows in Figure 1. By attaching several such elastic bands 30 at the same time to several different hooks 31 located north and south of each other on the earth 25 and then moving the earth 25 in its orbit by revolving arm 14, one may demonstrate how the angle of the sun rays 24 change from day to day and season to season or men standing at various points on the surface of the earth 25.

As above indicated, the North Polar tip of the earth 25 is always maintained in the same direction as the earth follows its orbit around the sun 18, that is, as the arm 14 is rotated about the pivot 11. This is accomplished by the pivotal arrangement of the turntable 33 and by means of the fixed and rotatable sprockets 36, 37, and chain 35. Thus, at one end of the earth 25's orbit, the North Pole of the earth 25 will tilt toward the sun 18 and at the other end of the orbit (representing a date six months later) the North Pole of the earth 25 will be tilted away from the sun 18, thus causing the north and south movement of the sun rays 24 upon the surface of the earth 25 as it follows its orbit about the sun 18 to be clearly demonstrated. Referring to Figure 1, for example, the sun rays 24 are seen to be focused directly upon an area on the earth 25 which is 23½ degrees north of the Equator, i. e., the Tropic of Cancer. "Six months later," when the earth 25 moves to an arc of 180 degrees about the sun 18, the sun rays 24 will be directly upon an area of the earth 25 which is 23½ degrees south of the Equator, i. e., the Tropic of Capricorn.

By synchronizing the orbit of the earth 25 about the sun 18, with the rotational speed of the earth 25 on its axis 38, one can keep any given point on the earth 25 facing the sun 18 during one complete rotation of bar 14, i. e., during one year in time. This will be helpful in demonstrating how the vertical rays of the sun 18 shuttle back and forth over a surface of the earth 25 during the course of a year's time. Similarly, by permitting the earth 25 to rotate once while moving the bar 14 a distance equal to only one day in time, one can demonstrate the true movement of the earth with respect to the sun.

It will be realized that the orbit of the earth 25 about the sun 18 and the rotation of the earth 25 on its axis 38 may be independently controlled or synchronized in a variety of relationships without applying the nature and scope of my invention, and such flexibility will be seen to contribute substantially to the teaching effectiveness of the device.

The plate 42 and light sources 45, 46 enable the globe 25, when formed of translucent material, to have one or the other halves thereof illuminated to illustrate the area of the earth illuminated by the sun 18. Thus, in Figure 1, the light impervious plate 42 is in such a position as to permit the entire area of globe 25 vertically aligned with the Arctic Circle to be illuminated to cause the entire area vertically aligned with the Anarctic Circle to be darkened. Thus can be demonstrated the great variation in length of daylight and darkness between the two areas at this period of the year. Thus, also, the point of sunrise and sunset can be determined at any degree of latitude and at any period of the year by observing the line of demarcation between daylight and darkness formed by the plate 42. By attaching the elastic band 30 to one of the hooks 31, which is at the point of sunrise, and timing the rotation of such hook from the point of sunrise to the point of sunset by the use of switch 27 and stop watch 28, the length of the daylight period in hours at the degree of latitude in which the particular hook 31 is located can be determined with ease and accuracy.

Dial 41, with various dates of the years imprinted in an arc on its face shown in Figure 7, may be used to determine the proper setting of the plate 42 so it will correspond with the date on base 10 at which pointer 39 indicates the earth 25 is located in its orbit. When the date indicated on dial 41 by pointer 48, mounted on handle 43, is the same as the date indicated on base 10 by pointer 39, the plate 42 inside the globe 25 is standing at right angles to the sun 18, so that by the proper setting of pointer 48 and illuminating of either light 45 or 46, whichever of them may be facing the sun 18 at any particular setting of pointer 48, one can illustrate that half of the earth 25 that is illuminated by the sun 18 at any point in the orbit of the earth 25. For example, in Figure 1, pointer 48 and pointer 39 would both be set at the date of June twenty-first. Plate 42 and pointer 48 are moved by handle 43 to the proper date, and friction element 49 on handle 43 prevents slippage and unintended movement of plate 42.

In a demonstration showing the number of sunrises, the automatic counter 52 would record for a person remaining at one of the positions represented by one of the hooks 31 on the earth's Equator, as compared with the number of sunrises of a person with experience who is traveling from hook 31 to hook 31 around the earth 25, going eastward or westward, and whose sunrises wounld be recorded by the hand-operated counter 53 each time the particular hook 31, at which the traveling person was then located, came into a period of sunrise, these two counters 52 and 53 would be essential. The hand-operated counter 53 would show that the person who was traveling about the earth 25 would have experienced either one more or less day or period of sunrise by the time he returned to his starting point (depending upon whether the person was traveling east or west) than the person who had remained in one position and whose periods of sunrise were automatically recorded by counter 52.

As above indicated, the globe 55 rotatable about the pivot 34 by handle 56 is effective to teach a great deal of information concerning the relationship of the moon, earth, and sun. For example, in the position shown in Figure 1, earth 25, moon 55, and sun 18 are in the position of the full-moon period. By moving handle 56 counterclockwise, so that spring friction 58 gauges a seventh notch on dial 57 beyond the one in which Figure 1 shows it, the position of the last quarter of the moon could be demonstrated.

Figure 2 shows in dotted lines the position of the earth 25 and the sun 18 at the time of the Fall Equinox, i. e., September twenty-first. Since plate 42 is bisecting the poles in Figure 2, if light 45 is illuminated by switch 47, one can illustrate how the line of demarcation between daylight and darkness exactly bisects the Poles of the earth 25, and thus, if one were to time the rotation of various points on the earth 25 from the point of sunrise to the point of sunset by the use of switch 27 and watch 28, one could easily determine that all points on the earth 25 had 12 hours of daylight and 12 hours of darkness at this period of the year. The date on the top of base 10, in this example, would indicate that this is a period of September twenty-first. Since shaft 38 pierces plate 42 at its center, the plate 10 may be turned by handle 43 to the right 180 degrees or to the left 180 degrees. Dial 41, therefore, shows two settings for March twenty-first and September twenty-first, the Spring and Fall Equinoxes. As the earth 25 is moved from the position shown in Figure 1 (June twenty-first) to the position shown in dotted lines in Figure 2 (September twenty-first), plate 42 may be turned by handle 43 in a counterclockwise direction so that pointer 48 will properly indicate each day along the period from June to September as shown on dial 41 in Figure 7. When the September twenty-first position is reached on dial 41, handle 43 must then be turned at 180 degrees clockwise to the September twenty-first setting on the opposite side of dial 41, as shown in Figure 7. This places plate 42 in the proper position so that it can again be turned counterclockwise to register the proper daily settings for the period in the orbit of the earth 25 from September to March, as shown on dial 41. When the March twenty-first position has been reached by moving handle 43 in pointer 48 counterclockwise from the September twenty-first to March twenty-first position, then handle 43 must be again turned a full 180 degrees in a clockwise direction to the March twenty-first setting on the opposite side of dial 41 to place plate 42 again in position to record the proper daily settings for the period in the orbit of the earth 25 of March through September.

The globe of Figures 9 and 10 may be used to demonstrate matters pertaining to the tides of the earth or of the oceans. For instance, by substituting the globe of Figures 9 or 10 for globe 25, to represent the earth, when the device is in the position shown in Figure 1, the sun 18, the earth 25, and moon 55 would be in a position of the full moon which is a period of high tides and one would inflate the balloon 74 by the use of the bulb 77 when balloon 74 rotated past moon 55, thus illustrating the pull of the moon 55 upon the ocean of the earth. This inflation would cause a bulge in the normal circumference of balloon 74, as shown by the dotted lines 79 in Figure 9. And in turn, as balloon 73 rotated past moon 55, one would inflate it by the use of bulb 78. Thus, by alternating the inflation and deflation of balloons 73 and 74, one could demonstrate the high and low tide period throughout the various stages of the moon 55.

I claim:

1. Means for teaching the effect of the moon upon the oceans of the world including a globe and means for rotating it, a second smaller globe spaced outwardly from said first-named globe, said first-named globe having expandable portions thereon, and means for expanding and retracting said portions.

2. For use with a teaching device, a globe, said globe having a substantially solid concave-convex central ring portion, expandable-contractable, flexible bladders secured to the opposite edges of said ring portion and effective, when expanded, to form with said ring portion a substantially spherical globe.

References Cited in the file of this patent
UNITED STATES PATENTS

| | | |
|---|---|---|
| 530,450 | Patton | Dec. 4, 1894 |
| 625,545 | Mitchell et al. | June 26, 1900 |
| 1,829,829 | Goodwin | Nov. 3, 1931 |
| 2,544,057 | Vanderhider | Mar. 6, 1951 |